US012280992B1

(12) United States Patent
Ying

(10) Patent No.: US 12,280,992 B1
(45) Date of Patent: Apr. 22, 2025

(54) TOOL FOR REMOVING SKIRTING BOARD

(71) Applicant: Siyang Ying, Yongkang (CN)

(72) Inventor: Siyang Ying, Yongkang (CN)

( * ) Notice: Subject to any disclaimer, the term of this patent is extended or adjusted under 35 U.S.C. 154(b) by 0 days.

(21) Appl. No.: 18/822,813

(22) Filed: Sep. 3, 2024

(51) Int. Cl.
*B66F 15/00* (2006.01)
*B25C 11/00* (2006.01)
*E04D 15/00* (2006.01)
*E04G 23/08* (2006.01)

(52) U.S. Cl.
CPC .............. *B66F 15/00* (2013.01); *B25C 11/00* (2013.01); *E04D 15/003* (2013.01); *E04G 2023/085* (2013.01)

(58) Field of Classification Search
CPC .......... B66F 15/00; B25C 11/00; B25D 1/045
USPC ............................................. 254/131, 27, 25
See application file for complete search history.

(56) References Cited

U.S. PATENT DOCUMENTS 1,167,574 A * 1/1916 Lechner .................. B25C 11/00 254/25
4,663,995 A * 5/1987 Amundson ........... E04D 15/003 30/169
11,858,790 B2 * 1/2024 Lenart ..................... B25C 11/00
2017/0107089 A1 * 4/2017 Lenart ....................... B25F 1/00
2020/0370317 A1 * 11/2020 Hile ........................ E04G 23/08

FOREIGN PATENT DOCUMENTS

GB 2431131 A * 4/2007 ............... B25D 3/00

OTHER PUBLICATIONS

Goldblatt (Goldblatt's Molding Remover; found at: https://www.youtube.com/watch?v=yKQUKIWwVA8 ). (Year: 2020).*
Temu Trim Puller (Year: 2024).*

* cited by examiner

*Primary Examiner* — Mahdi H Nejad
(74) *Attorney, Agent, or Firm* — Birchwood IP

(57) ABSTRACT

A tool for removing a skirting board is provided, which includes a connection plate, an engagement plate, and a prying plate; the engagement plate extends downward from a front end of the connection plate and continues to extend forward to an upper end of the prying plate so as to form an inner bending area; the connection plate is provided with a striking part that cooperates with a hammer to knock the prying plate downward into a gap between the skirting board and a wall surface; a handle is fixed at a rear end of the connection plate; an abutting plate is provided above the prying plate, a rotating structure is provided between the abutting plate and the engagement plate, and the rotating structure is provided in the inner bending area.

7 Claims, 10 Drawing Sheets

TOOL FOR REMOVING SKIRTING BOARD

CROSS-REFERENCE TO RELATED APPLICATIONS

This application claims priority to Chinese Patent Application No. 202422045090.8, filed on Aug. 22, 2024, which is hereby incorporated by reference in its entirety.

TECHNICAL FIELD

The present disclosure relates to the field of construction equipment technologies, and in particular, to a tool for removing a skirting board.

BACKGROUND

Skirting board, also known as skirting line, is a structure that connects an inner side of an exterior wall and both sides of an interior wall with an indoor floor. The setting of the skirting board can prevent wall contamination during sweeping and has an effect of moisture-proof and protecting the wall base.

When it is necessary to carry out refitting or remove the skirting board, in the existing technology, it is generally done by gently knocking a top of the skirting board with a tool such as a hammer. After all positions at the connection between the skirting board and the wall are open, the skirting board can be removed by hand or a pry bar. Otherwise, it is easy to damage the wall, the operation is very complicated, and the work efficiency is very low.

SUMMARY

To solve the above problems, the present disclosure proposes a tool for removing a skirting board.

The technical solution adopted by the present disclosure is a tool for removing a skirting board, configured to pry open the skirting board located at a bottom of a wall surface, and the tool includes:

- a prying plate main body, which includes a connection plate, an engagement plate, and a prying plate; the engagement plate extends downward from a front end of the connection plate and continues to extend forward to an upper end of the prying plate so as to form an inner bending area; where an extension direction of the connection plate is a first direction, an extension direction of the prying plate is a second direction, the first direction and the second direction form an angle with each other; the connection plate is provided with a striking part that cooperates with a hammer so as to knock the prying plate downward into a gap between the skirting board and the wall surface;
- a handle, fixed at a rear end of the connection plate;
- an abutting plate, provided above the prying plate, there is a rotating structure between the abutting plate and the engagement plate, and the rotating structure is provided in the inner bending area;
- the tool has a working state and a non-working state; when in the working state, the abutting plate abuts against the wall surface, and the prying plate is rotated backwards through the rotating structure and prying open the skirting board; when in the non-working state, a front end of the abutting plate and a front end of the prying plate are coplanar.

The following further provide several optional implementation modes, but they do not serve as additional limitations on the technical solution of the present disclosure. Without technical or logical contradictions, the implementation mode can be combined separately, or it can be a combination between multiple implementation modes.

In some embodiment of the present disclosure, the rotating structure includes:

- a first shaft sleeve, which is fixed at one side of the inner bending area of the engagement plate;
- a third shaft sleeve, which is fixed at a rear side of the abutting plate;
- a first shaft rod, which is rotatably connected inside the first shaft sleeve and the third shaft sleeve.

In some embodiment of the present disclosure, the striking part is provided at the front end of the connection plate.

In some embodiment of the present disclosure, when in the non-working state, a lower end of the abutting plate abuts against the upper end of the prying plate.

In some embodiment of the present disclosure, a lower end of the prying plate is provided with a plug-in end configured to be inserted into the gap between the skirting board and the wall surface, and the plug-in end is in a wedge shape.

In some embodiment of the present disclosure, left and right sides of an upper end of the abutting plate is provided with two bending portions extending backward, and a yielding port is provided between the two bending portions.

In some embodiment of the present disclosure, the tool further includes a shovel blade, which is rotatably installed above the connection plate; an end of the shovel blade extends to a front end of the prying plate main body and being in a shoveling state when the shovel blade is rotated forward; the shovel blade is attached to an upper end of the connection plate and being in a storage state when the shovel blade is rotated backward.

In some embodiment of the present disclosure, the upper end of the connection plate is provided with a second shaft sleeve, one end of the shovel blade is provided with at least one sleeve block; the sleeve block is provided with a strip-shaped hole, and the strip-shaped hole extends along an extension direction of the shovel blade; where the second shaft sleeve is rotatably provided with a second shaft rod, which passes through the strip-shaped hole; a tension spring is provided between the shovel blade and the second shaft rod.

In some embodiment of the present disclosure, upper and lower sides of the shovel blade are respectively provided with a pull-up block and a pull-down block, and the connection plate is provided with a first bayonet and a second bayonet; the second bayonet is located behind the first bayonet; when in the storage state, the pull-down block is clamped in the first bayonet, and in the shoveling state, the pull-up block is clamped in the second bayonet.

In some embodiment of the present disclosure, the connection plate is provided with a downward concave portion, the concave portion is located behind the striking part; the socket block and the second shaft sleeve are both provided above the concave portion.

Compared with the existing technology, the present disclosure has the following beneficial effects.

When it is necessary to remove the skirting board from the wall surface, an operator holds the handle and the lower end of the prying plate main body is placed directly over the gap between the skirting board and the wall surface, then a hammer is used to strike the striking part on the connection plate so as to knock the prying board into the gap. In the non-working state, the front end of the abutting plate and the front end of the prying plate are coplanar. At this time, the abutting plate abuts against the wall surface, and the handle is flipped upwards. Since the handle is fixed at the rear end of the prying plate main body, it can drive the prying plate main body to flip counterclockwise with the first shaft sleeve as a pivot point. During this process, the prying plate can be rotated backwards, and the skirting board can be pried open. The operation is simple, the work efficiency is high, it can ensure that the wall surface will not be damaged during a process of prying open the skirting board and has strong practicality.

BRIEF DESCRIPTION OF DRAWINGS

In order to provide a clearer explanation of the embodiments of the present disclosure or the technical solutions in the prior art, a brief introduction will be given to the accompanying drawings required for the description of the embodiments or the prior art. It is obvious that the accompanying drawings described below are only some embodiments of the present disclosure. For those skilled in the art, other drawings can be obtained based on the structures shown in these drawings without creative work.

Figure 1:
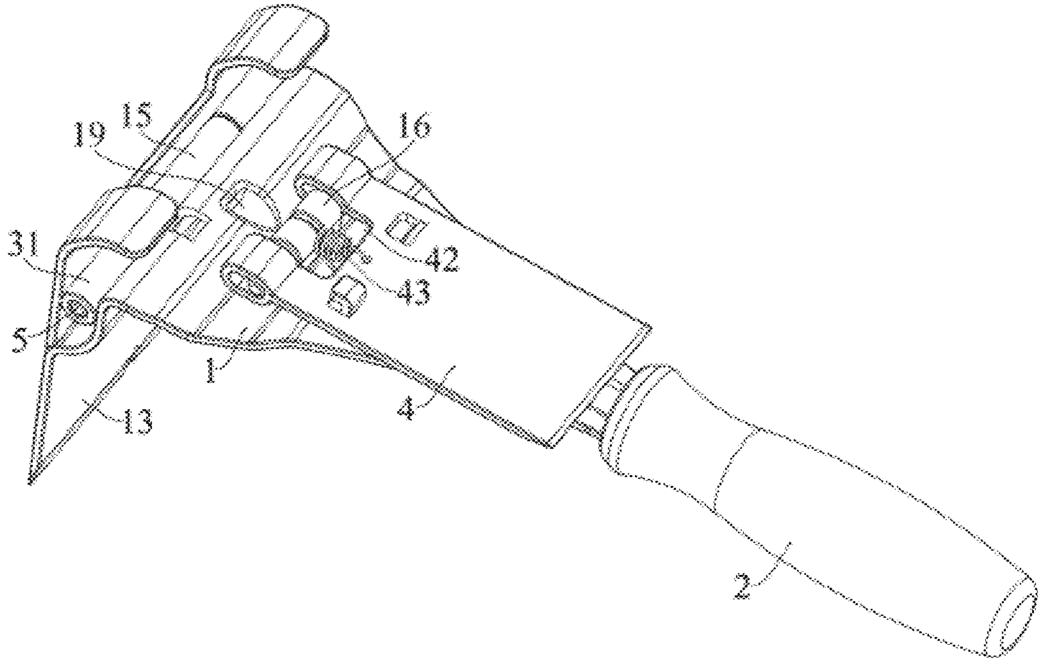
FIG. 1 shows an overall structure of an upper perspective in a non-working state in an embodiment of the present application.

Numeral reference: 1-prying plate main body, 11-connection plate, 111-striking part, 112-concave portion, 12-engagement plate, 13-prying plate, 131-plug-in end, 132-notch, 14-reinforcing rib, 15-first shaft sleeve, 16-second shaft sleeve, 161-opening, 17-first bayonet, 18-second bayonet, 19-recess, 2-handle, 3-abutting plate, 31-third shaft sleeve, 32-bending portion, 33-yielding port, 4-shovel blade, 41-sleeve block, 411-strip-shaped hole, 42-through port, 43-tension spring, 44-pull-up block, 45-pull-down block, 5-first shaft rod, 6-second shaft rod, 7-wall surface, 8-skirting board.

The implementation, functional characteristics, and advantages of the purpose of the present disclosure will be further explained in combination with the embodiments and with reference to the accompanying drawings.

DESCRIPTION OF EMBODIMENTS

The following will provide a clear and complete description of the technical solution in the embodiments of the present disclosure, based on the accompanying drawings. Obviously, the described embodiments are only a part of the embodiments of the present disclosure, not all of them. Based on the embodiments in the present disclosure, all other embodiments obtained by those skilled in the art without creative work are within the protection scope of the present disclosure.

It should be noted that all directional indications (such as up, down, left, right, front, back, etc.) in the embodiments of the present disclosure are only used to explain a relative position relationship and motion of each component in a specific posture (as shown in the attached drawings). If a specific posture changes, the directional indication will also change accordingly.

In addition, the descriptions of "first", "second", etc. in the present disclosure are only for a descriptive purpose and cannot be understood as indicating or implying their relative importance or implying the number of technical features indicated. Therefore, the features that are limited to "first" and "second" can explicitly or implicitly include at least one of these features. Besides, the technical solutions between various embodiments can be combined with each other, but they must be based on the ability of ordinary technical personnel in this field to implement them. When the combination of technical solutions is contradictory or impossible to achieve, it should be considered that this combination of technical solutions does not exist and is not within the protection scope of required by the present disclosure.

Specific implementation modes: referring to FIGS. 1-10, the present disclosure is a tool for removing a skirting board, which is configured to pry open the skirting board 8 located at a bottom of a wall surface 7. The tool includes:

a prying plate main body 1, which includes a connection plate 11, an engagement plate 12, and a prying plate 13; the engagement plate 12 extends downward from a front end of the connection plate 11 and continues to extend forward to an upper end of the prying plate 13 so as to form an inner bending area; where an extension direction of the connection plate 11 is a first direction, an extension direction of the prying plate 13 is a second direction; the first direction and the second direction form an angle with each other; the connection plate 11 is provided with a striking part 111 that cooperates with a hammer to knock the prying plate 13 downward into a gap between the skirting board 8 and the wall surface 7;

a handle 2, fixed at a rear end of the connection plate 11;

an abutting plate 3, provided above the prying plate 13, there is a rotating structure between the abutting plate 3 and the engagement plate 12, and the rotating structure is provided in the inner bending area;

the tool has a working state and a non-working state; when in the working state, the abutting plate 3 abuts against the wall surface 7, and the prying plate 13 is rotated backwards through the rotating structure and prying open the skirting board 8; when in the non-working state, a front end of the abutting plate 3 is coplanar with a front end of the prying plate 13.

In this embodiment, the angle between the first direction and the second direction is 90°, or between 80° to 100°, so that an outline of the prying plate main body 1 resembles a "7" shape, rendering it easy to operate.

Then, in order to enhance a structural strength of the prying plate main body 1, in this embodiment, a reinforcing rib 14 is integrated along its own extension direction on the connection plate 11, and the connection plate 11, the engagement plate 12, and the prying plate 13 are integrally formed.

Figure 4:
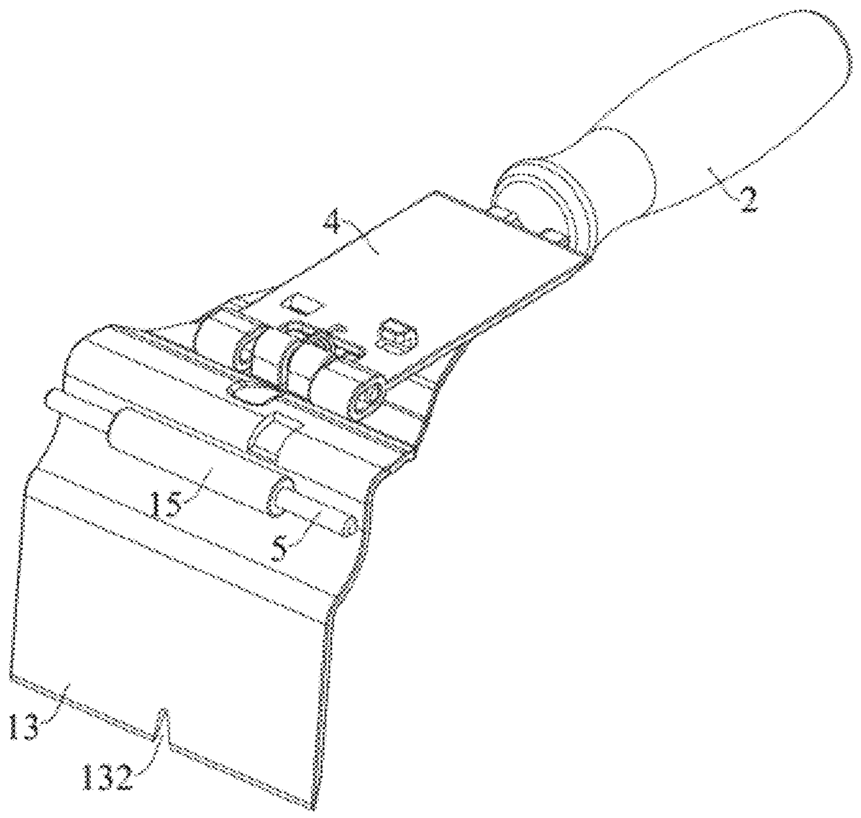
FIG. 4 shows an overall structural diagram of hiding an abutting plate in an embodiment of the present application.

In an implementation mode, please refer to FIGS. 1 and 4. It can be seen that the rotating structure includes:

- a first shaft sleeve 15, which is fixed at one side of the inner bending area of the engagement plate 12;
- a third shaft sleeve 31, which is fixed at a rear side of the abutting plate 3;
- a first shaft rod 5, which is rotatably connected inside the first shaft sleeve 15 and the third shaft sleeve 31.

In this embodiment, by providing with the engagement plate 12 and forming the inner bending area on the engagement plate 12, it is possible to ensure that the front end of the abutting plate 3 and the front end of the prying plate 13 are coplanar while ensuring providing the rotating structure.

The working principle of the rotating structure: as the first shaft sleeve 15 is fixed on the engagement plate 12, the third shaft sleeve 31 is fixed on the abutting plate 3, and the first shaft rod 5 is rotatably connected inside the first shaft sleeve 15 and the third shaft sleeve 31. Thus, when a position of the abutting plate 3 is fixed, by holding the handle 2 and flipping it upwards, the prying plate main body can be driven to be rotated counterclockwise relative to the abutting plate 3 with the first shaft rod 5 as a rotation axis.

Figure 5:
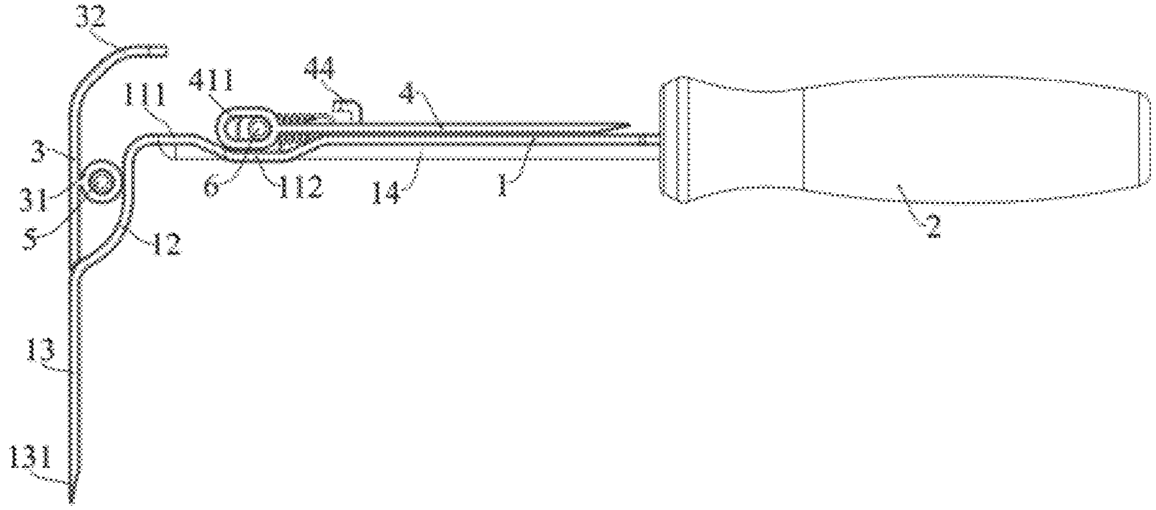
FIG. 5 is an overall side view in the non-working state in an embodiment of the present application.
Figure 6:
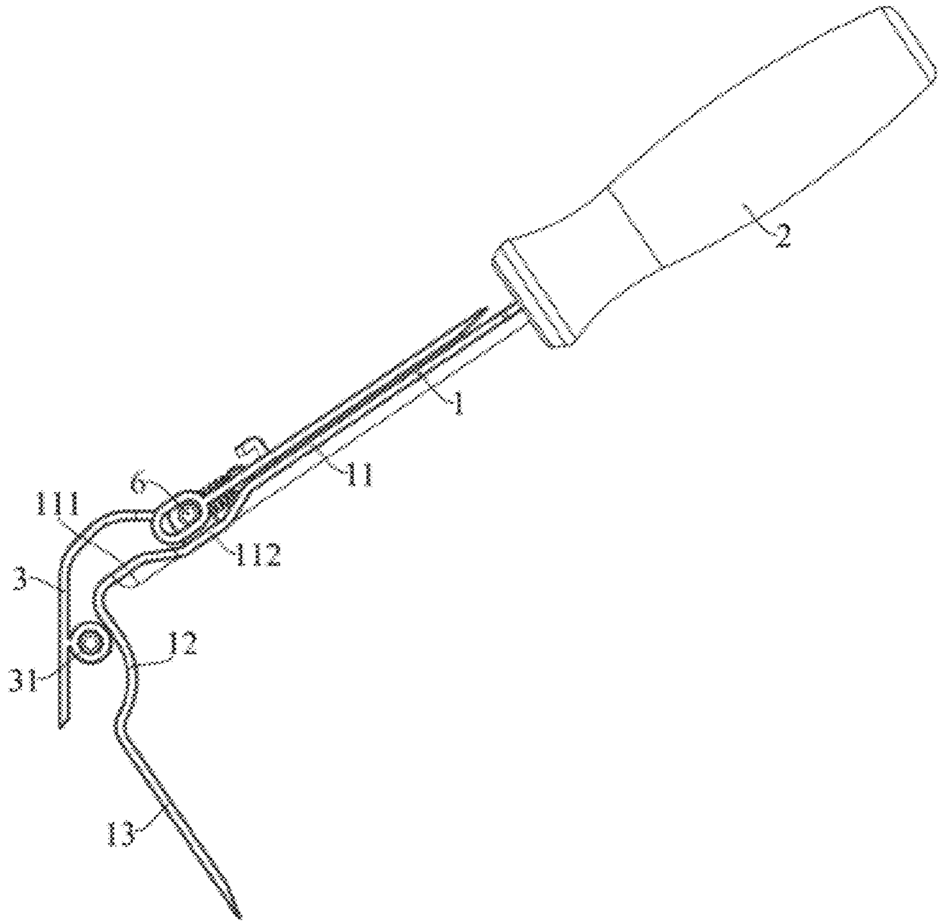
FIG. 6 is an overall side view in a working state in an embodiment of the present application.

Next, please refer to FIG. 5. It can be seen that in this embodiment, the striking part 111 is provided at the front end of the connection plate 11.

Figure 7:
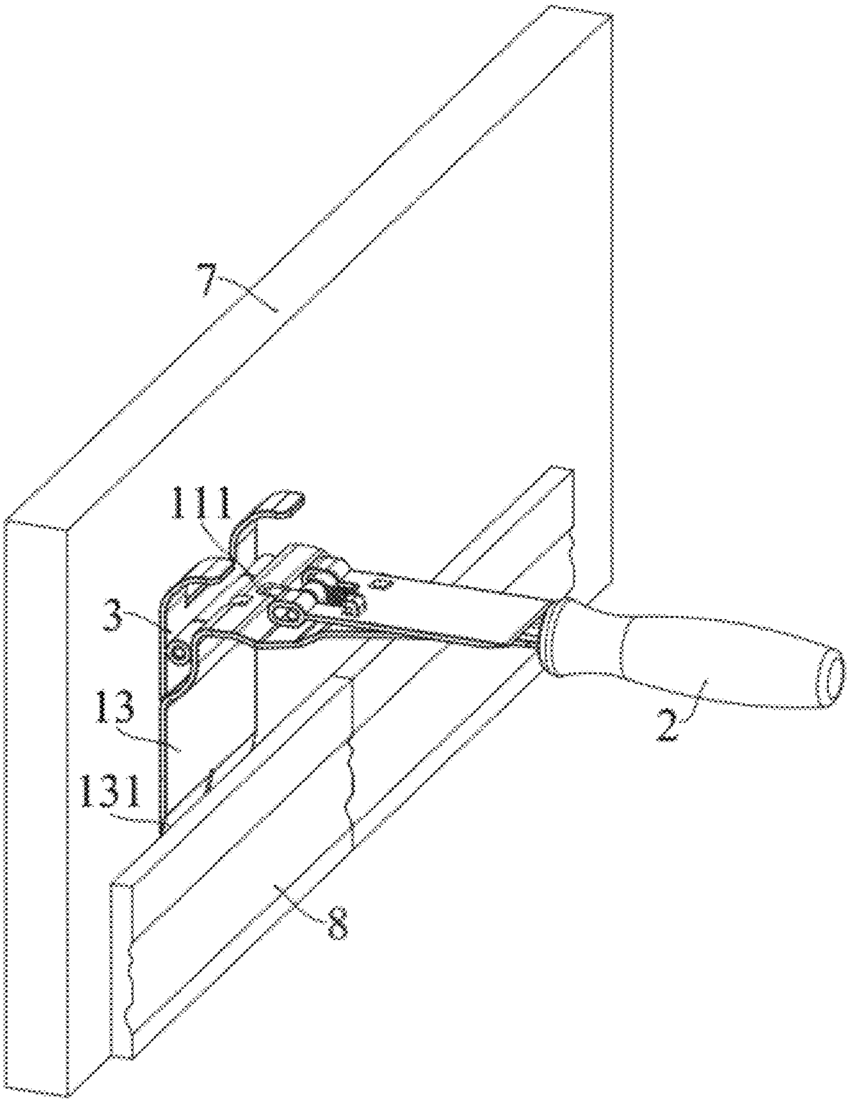
FIG. 7 is a schematic structural diagram when a lower end of a prying plate being aligned with a gap between a skirting board and a wall surface in an embodiment of the present application.
Figure 8:
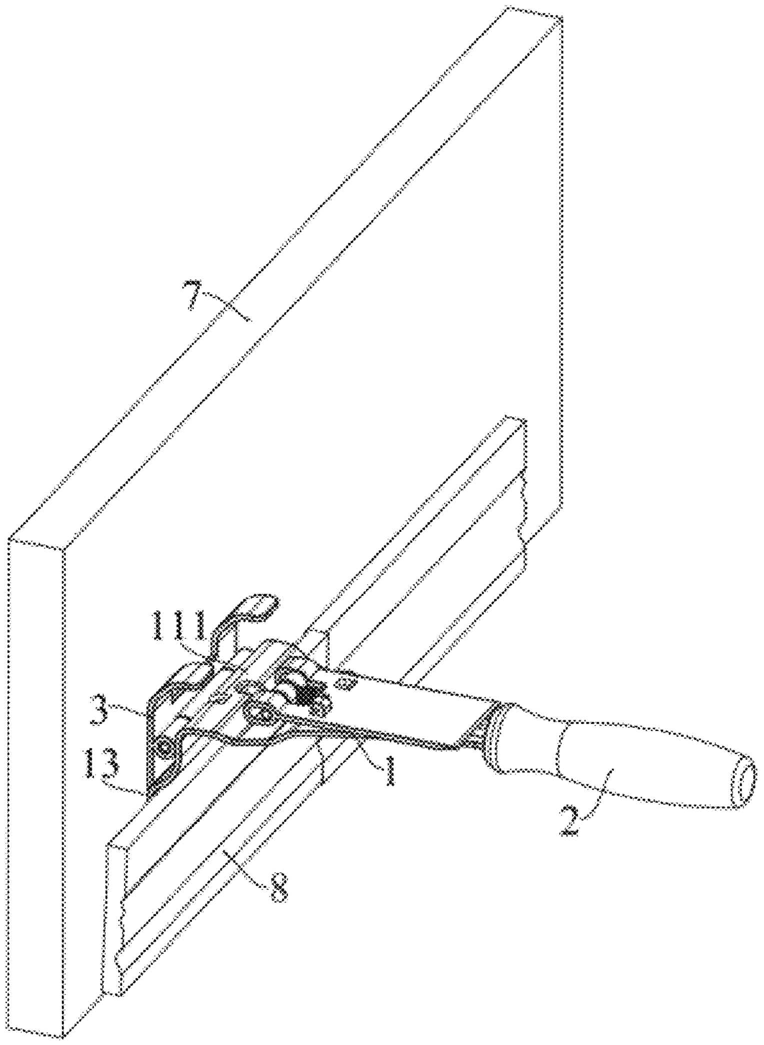
FIG. 8 is a schematic structural diagram in which the prying plate is knocked into the gap between the skirting board and the wall surface in an embodiment of the present application.
Figure 9:
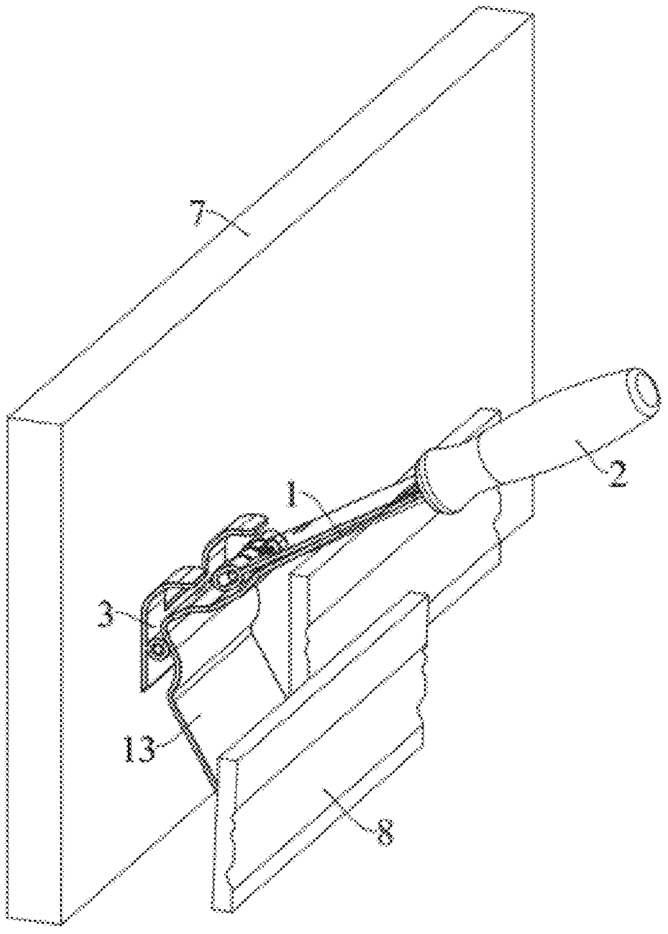
FIG. 9 is a schematic structural diagram in which a handle is flipped upwards, and the skirting board is pried open by the prying plate in an embodiment of the present application.

Here, please continue to refer to FIGS. 7 and 8. When a lower end of the prying plate 13 is placed directly above the gap between the skirting board 8 and the wall surface 7 (usually by holding the handle 2 of the tool with a left hand and operating the hammer with a right hand), the hammer is stroked on the striking part 111 so as to knock the prying plate 13 into the gap between the skirting board 8 and the wall surface 7, the striking part 111 is provided at the front end of the connection plate 11 so as to ensure a strength of the strike.

Figure 2:
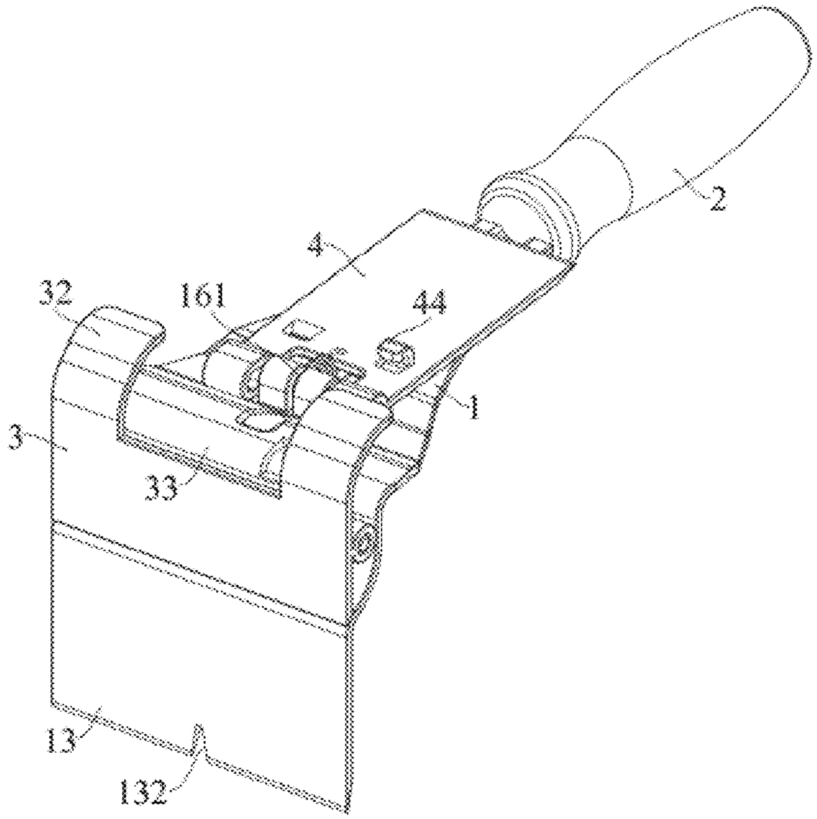
FIG. 2 shows an overall structure of a front view in the non-working state in an embodiment of the present application.

Then, referring to FIG. 2, in the non-working state, a lower end of the abutting plate 3 abuts against the upper end of the prying plate 13. In this way, on the one hand, when the front end of the abutting plate 3 is coplanar with the front end of the prying plate 13, a structural stability of an installation of the abutting plate 3 can be ensured; on the other hand, in the non-working state, when the handle 2 is holed and the connection plate 11 is kept to be horizontal, the abutting plate 3 can maintain being abutted above the prying plate 13 by its own gravity.

Besides, please refer to FIG. 2. The lower end of the prying plate 13 is provided with a plug-in end 131 configured to be inserted into the gap between the skirting board 8 and the wall surface 7. In order to render it is easier to insert the plug-in end 131 into the gap between the skirting board 8 and the wall surface 7, in this embodiment, the plug-in end 131 is in a wedge shape, and a notch 132 is provided in a middle position of the plug-in end 131.

Here, the notch 132 being provided in the middle position of the plug-in end 131 facilitates a removal of a floor nail on the ground through this notch 132. When it is necessary to remove the floor nail, the handle 2 is holed and the floor nail is clipped into the notch 132. Then, the handle 2 is driven to rotate the prying plate main body 1 so as to remove the floor nail.

Then, in order to enhance the structural strength of the abutting plate 3, in this embodiment, two bending portions 32 extending backwards are respectively provided on left and right sides of an upper end of the abutting plate 3, and a yielding port 33 is provided between the two bending portions 32.

Here, the striking part 111 on the connection plate 11 is located directly behind the yielding port 33. Therefore, by providing with the yielding port 33, it is more convenient to strike the striking part 111 with a hammer. In a practical operation, the hammer is simply used to lightly strike the striking part 111 so as to knock the prying plate 13 into the gap.

For ease of understanding, please refer to FIGS. 5-9. The following is an explanation of an operation step of the removal tool.

Firstly, please refer to FIG. 7, the handle 2 is holed, and the prying plate 13 and the abutting plate 3 of the prying plate main body 1 are pressed against the wall surface 7, the lower end of the prying plate 13 is aligned above the gap between the skirting board 8 and the wall surface 7. Next, please refer to FIG. 8, a hammer is used to strike the striking part 111 so as to knock the prying plate 13 into the gap. Note that due to a presence of the engagement plate 12, when the prying plate 13 is fully inserted into the gap, the abutting plate 3 will not continue to enter the gap. At this time, the abutting plate 3 is located above the skirting board 8 and remains to be abutting against the wall surface 7. Then, referring to FIG. 9, when it is necessary to pry out the skirting board 8, the handle 2 is hold, and it is rotated upwards. Referring to the principle described above, at this time, the prying plate 13 can pry out the skirting board 8 outward.

After a removal processing is completed, the removal tool is removed from the wall surface 7. At this time, the connection plate 11 remains in a relatively horizontal position, and the abutting plate 3 resets by its own gravity and returns to the non-working state. At this time, the front end of the abutting plate 3 is coplanar with the front end of the prying plate 13.

In an implementation mode, please refer to FIGS. 1, 2, 3, and 10. In this embodiment, the removal tool further includes a shovel blade 4, which is rotatably installed above the connection plate 11. An end of the shovel blade 4 extends to a front end of the prying plate main body 1 and being in a shoveling state when the shovel blade 4 is rotated forward; the shovel blade 4 is attached to an upper end of the connection plate and being in a storage state when the shovel blade 4 is rotated backward.

In this embodiment, the upper end of the connection plate 11 is provided with a second shaft sleeve 16, one end of the shovel blade 4 is provided with at least one sleeve block; the sleeve block 41 is provided with a strip-shaped hole 411, which extends along an extension direction of the shovel blade 4. The second shaft sleeve 16 is rotatably provided with a second shaft rod 6, which passes through the strip-shaped hole 411. A tension spring 43 is provided between the shovel blade 4 and the second shaft rod 6.

In this embodiment, for a convenience of installing the tension spring 43, there are two sleeve blocks 41, which are respectively provided at left and right ends of the second shaft 6. The second shaft 6 is provided between the two sleeve blocks 41, and the second shaft 6 is provided with an opening 161. The shovel blade 4 is provided with a through port 42, which is provided between the two sleeve blocks 41. Two ends of the tension spring 43 are respectively connected to the second shaft rod 6 corresponding to a position of the opening 161 and a bottom end of the through port 42.

Then, upper and lower sides of the shovel blade 4 are respectively provided with a pull-up block 44 and a pull-down block 45. The connection plate 11 is provided with a first bayonet 17 and a second bayonet 18, the second bayonet 18 is located behind the first bayonet 17. When in the storage state, the pull-down block 45 is clamped in the first bayonet 17, and in the shoveling state, the pull-up block 44 is clamped in the second bayonet 18.

In an implementation mode, the connection plate 11 is provided with a downward concave portion 112, which is located behind the striking part 111. The sleeve block 41 and the second shaft sleeve 16 are both provided above the concave portion 112.

In additional, in this embodiment, both the pull-up block 44 and the pull-down block 45 have a "7-shaped structure. An upper end surface of the connection plate 11 is further provided with a recess 19, and in the shoveling state, the tension spring 43 can be placed in the recess 19.

Installation and operation principle of shovel blade 4 are as following.

Figure 3:
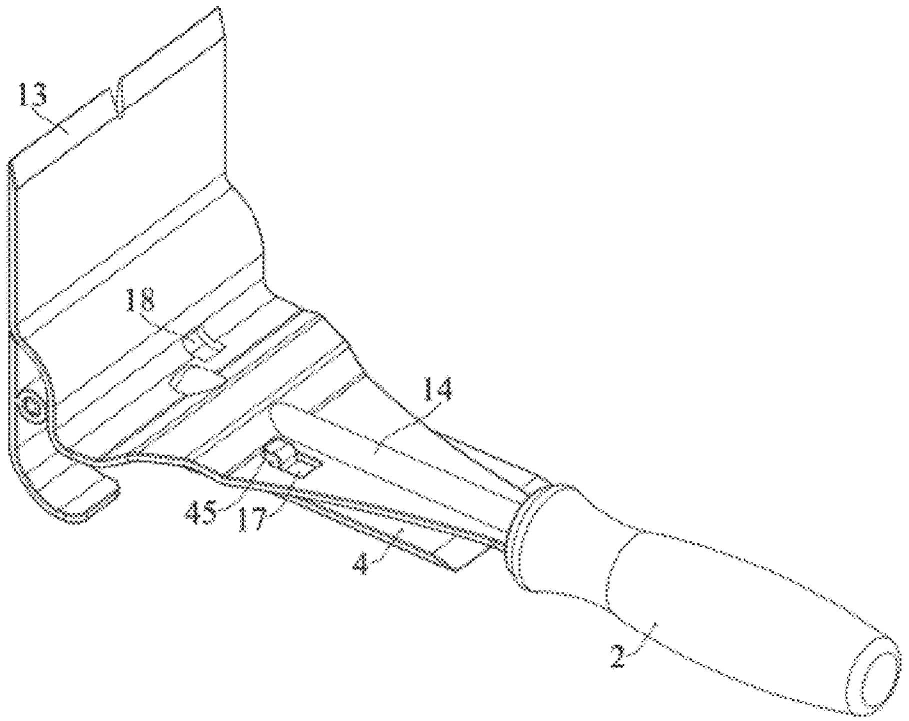
FIG. 3 is a schematic diagram of an overall structure from a lower perspective in the non-working state in an embodiment of the present application.
Figure 10:
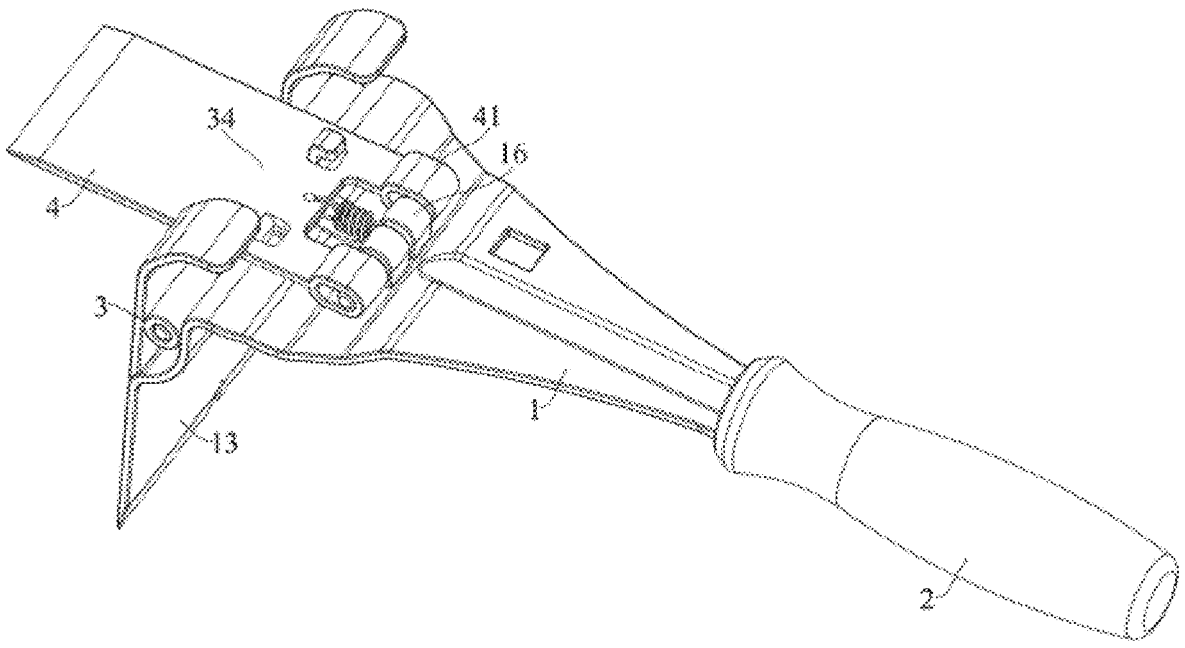
FIG. 10 is a schematic structural diagram in which a shovel blade is flipped forward and switched to a shoveling state in an embodiment of the present application.

In the storage state, please refer to FIG. 3. It can be seen that the pull-down block 45 is inverted in the first bayonet and is located at a front end of the first bayonet 17. At this time, the tension spring 43 is in a preliminary tension state and fixed at a position of the shovel blade 4. The second shaft rod 6 is located at a rear end of the strip-shaped hole 411, and the shovel blade 4 is placed above the connection plate 11. When the shovel blade 4 is used, it is necessary to push the two sleeve blocks 41 backwards by hand and move the second shaft rod 6 to a front end of the strip-shaped hole 411. At this time, the tension spring 43 will be stretched to a greater extent, and the pull-down block 45 will be detached from the first bayonet 17, the shovel blade 4 is flipped forward and passes through the yielding port 33 until the shovel blade 4 is flipped to the shoveling state as shown in FIG. 10. The end of shovel blade 4 extends to the front end of the prying plate main body 1. It should be noted that in order to fix the position of the shovel blade 4, it is necessary to first stretch the shovel blade 4 forward and allow the pull-up block 44 to enter the second bayonet 18. Then, the shovel blade 4 is released to retract the tension spring 43 and fix the position of the shovel blade 4. In the shoveling state, the operator can hold handle 2 and use shovel blade 4 to remove cement dirt stuck on the ground or wall surface 7.

As described above, a structural design of the shovel blade 4 enables the removal tool to have multiple functions in addition to removing the skirting board, rendering it more competitive in the market.

The above description is only preferred embodiments of the present disclosure and does not limit the scope of the present disclosure. Any equivalent structural transformation made under an inventive concept of the present disclosure using the content of this specification and drawings, or directly/indirectly applied in other related technical fields, are included in the protection scope of the present disclosure.

What is claimed is:

1. A tool for removing a skirting board, configured to pry open the skirting board located at a bottom of a wall surface, wherein the tool comprises:

a prying plate main body, which comprises a connection plate, an engagement plate, and a prying plate; the engagement plate extends downward from a front end of the connection plate and continues to extend forward to an upper end of the prying plate so as to form an inner bending area; wherein an extension direction of the connection plate is a first direction, an extension direction of the prying plate is a second direction, the first direction and the second direction form an angle with each other; the connection plate is provided with a striking part that cooperates with a hammer so as to knock the prying plate downward into a gap between the skirting board and the wall surface;

a handle, fixed at a rear end of the connection plate;

an abutting plate, provided above the prying plate, there is a rotating structure between the abutting plate and the engagement plate, and the rotating structure is provided in the inner bending area;

wherein the tool has a working state and a non-working state; when in the working state, the abutting plate abuts against the wall surface, and the prying plate is rotated backwards through the rotating structure and prying open the skirting board; when in the non-working state, a front end of the abutting plate and a front end of the prying plate are coplanar;

wherein the rotating structure comprises:

a first shaft sleeve, which is fixed at one side of the inner bending area of the engagement plate;

a third shaft sleeve, which is fixed at a rear side of the abutting plate;

a first shaft rod, which is rotatably connected inside the first shaft sleeve and the third shaft sleeve;

wherein the striking part is provided at the front end of the connection plate;

wherein when in the non-working state, a lower end of the abutting plate abuts against the upper end of the prying plate.

2. The tool for removing the skirting board according to claim 1, wherein a lower end of the prying plate is provided with a plug-in end configured to be inserted into the gap between the skirting board and the wall surface, and the plug-in end is in a wedge shape.

3. The tool for removing the skirting board according to claim 1, wherein left and right sides of an upper end of the abutting plate are provided with two bending portions extending backward, and a yielding port is provided between the two bending portions.

4. The tool for removing the skirting board according to claim 3, further comprising a shovel blade, which is rotatably installed above the connection plate; an end of the shovel blade extends to a front end of the prying plate main body and being in a shoveling state when the shovel blade is rotated forward; the shovel blade is attached to an upper end of the connection plate and being in a storage state when the shovel blade is rotated backward.

5. The tool for removing the skirting board according to claim 4, wherein the upper end of the connection plate is provided with a second shaft sleeve, one end of the shovel blade is provided with at least one sleeve block; the at least one sleeve block is provided with a strip-shaped hole, and the strip-shaped hole extends along an extension direction of the shovel blade;

wherein the second shaft sleeve is rotatably provided with a second shaft rod, which passes through the strip-shaped hole;

a tension spring is provided between the shovel blade and the second shaft rod.

6. The tool for removing the skirting board according to claim 5, wherein upper and lower sides of the shovel blade are respectively provided with a pull-up block and a pull-down block; the connection plate is provided with a first bayonet and a second bayonet; the second bayonet is located behind the first bayonet;

when in the storage state, the pull-down block is clamped in the first bayonet, and in the shoveling state, the pull-up block is clamped in the second bayonet.

7. The tool for removing the skirting board according to claim 6, wherein the connection plate is provided with a downward concave portion, the concave portion is located behind the striking part; a socket block and the second shaft sleeve are both provided above the concave portion.

* * * * *